United States Patent [19]

Smart et al.

[11] Patent Number: 5,748,990
[45] Date of Patent: May 5, 1998

[54] ONE-TIME-USE CAMERA WITH LID FLEXED TO UNCOVER CHAMBER WHEN CASSETTE FORCIBLY EJECTED FROM CHAMBER

[75] Inventors: David Clinton Smart; Ralph Merwin Lyon, both of Rochester, N.Y.

[73] Assignee: Eastman Kodak Company, Rochester, N.Y.

[21] Appl. No.: 851,555

[22] Filed: May 5, 1997

Related U.S. Application Data

[63] Continuation of Ser. No. 590,719, Jan. 24, 1996, abandoned.

[51] Int. Cl.[6] .................................................. G03B 17/00
[52] U.S. Cl. ............................... 396/6; 396/536; 396/538
[58] Field of Search .................................. 396/6, 535, 536, 396/537, 538

[56] References Cited

U.S. PATENT DOCUMENTS

| | | | |
|---|---|---|---|
| 4,095,249 | 6/1978 | Miura | 354/288 |
| 4,751,536 | 6/1988 | Ohmura et al. | 354/75 |
| 4,890,130 | 12/1989 | Takei et al. | 354/288 |
| 4,954,858 | 9/1990 | Ohmura et al. | 354/288 |
| 5,142,316 | 8/1992 | Tanii et al. | 354/288 |
| 5,231,438 | 7/1993 | Smart | 354/281 |
| 5,357,303 | 10/1994 | Wirt | 354/275 |
| 5,359,378 | 10/1994 | Zander et al. | 354/275 |
| 5,550,608 | 8/1996 | Smart et al. | 354/174 |
| 5,555,063 | 9/1996 | Balling | 354/288 |

*Primary Examiner*—Eddie C. Lee
*Attorney, Agent, or Firm*—Roger A. Fields

[57] ABSTRACT

A camera has a chamber for holding a film cassette and a lid for closing the chamber. An ingress opening to the chamber is located to admit an insertion tool into the chamber to push the cassette against the lid to move the lid to open the chamber, to permit the cassette to be pushed out of the chamber. The chamber and the lid have respective peripheries with mutually engaging light-trapping portions which engage to secure the lid to light-tightly close the chamber, but which are separated when the lid is moved to open the chamber. The lid is flexible and has a fixed projection which protrudes into the chamber to be pushed by the cassette to flex the lid partially out of the chamber to make the engaging portion of the lid separate from the engaging portion of the chamber.

9 Claims, 12 Drawing Sheets

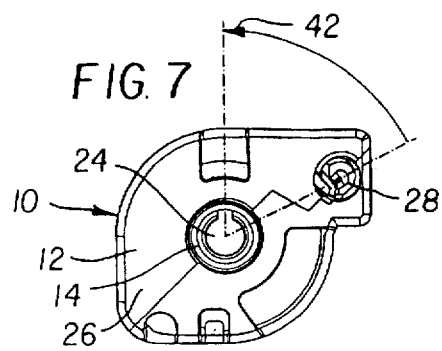
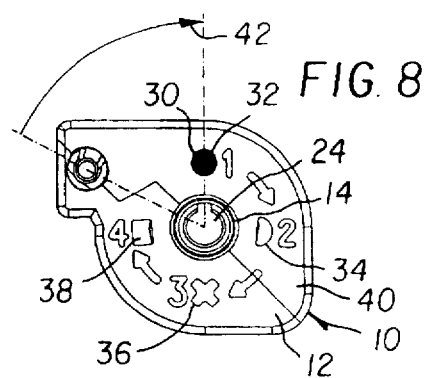
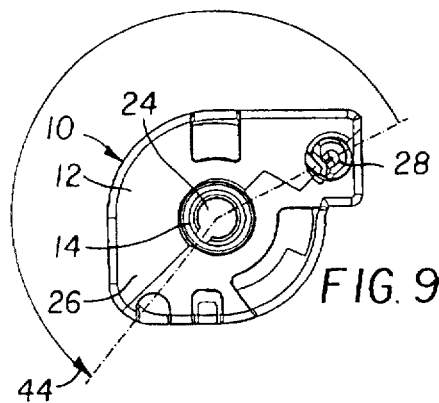
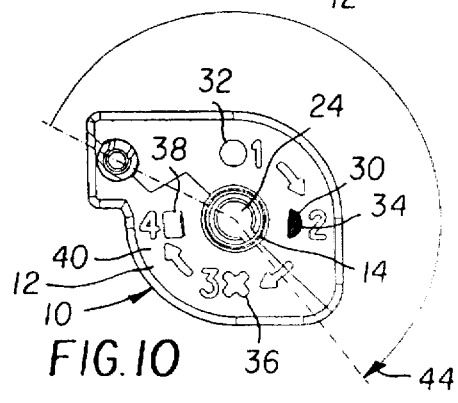
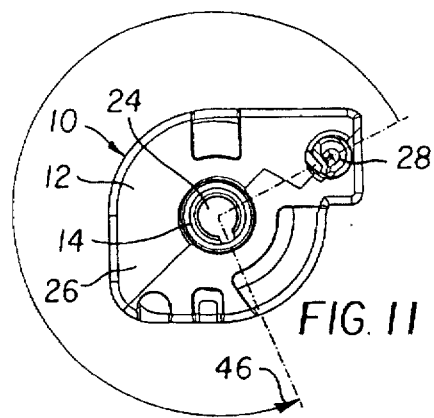
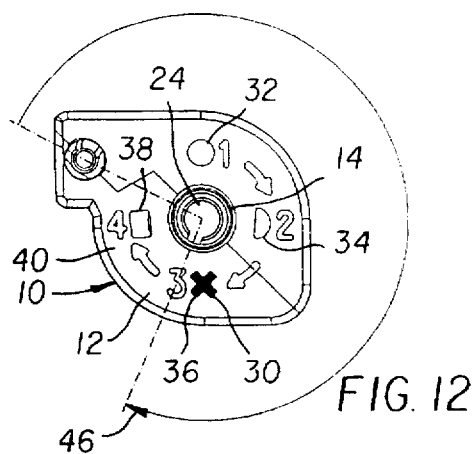
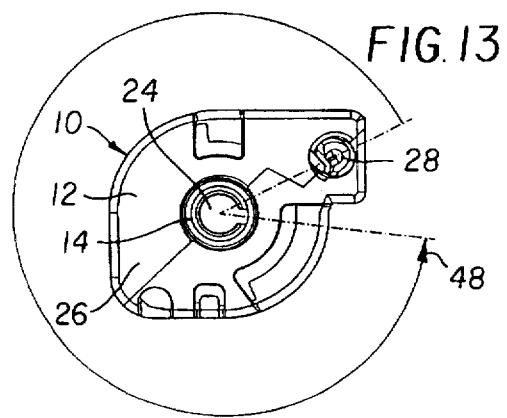
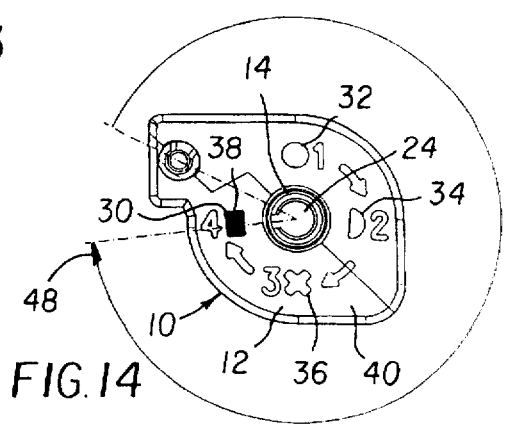

ONE-TIME-USE CAMERA WITH LID FLEXED TO UNCOVER CHAMBER WHEN CASSETTE FORCIBLY EJECTED FROM CHAMBER

CROSS-REFERENCE TO RELATED APPLICATIONS

This is a continuation of application Ser. No. 08/590,719, filed Jan. 24, 1996 now abandoned.

Reference is made to commonly assigned application Ser. No. 08/371,336, now U.S. Pat. No. 5,506,608, entitled APPARATUS AND METHOD FOR CLOSING LIGHT LOCK OF FILM CASSETTE AND UNLOADING CASSETTE FROM CAMERA and filed Jan. 11, 1995 in the names of David C. Smart and Thomas E. Dussinger, Ser. No. 08/590,968, entitled CAMERA WITH FILM SENSOR AND DRIVER TO INITIATE CLOSING OF CASSETTE RESPONSIVE TO RETURN OF FILMSTRIP TO CASSETTE and filed Jan. 24, 1996 in the names of David C. Smart and Douglas H. Pearson, Ser. No. 08/590,662, now U.S. Pat. No. 5,708,854 entitled ONE-TIME-USE CAMERA HAS DRIVER FOR CLOSING FILM CASSETTE WHICH IS REMOVED WITH CLOSED CASSETTE TO DISABLE CAMERA AFTER COMPLETED USE and filed Jan. 24, 1996 in the names of David C. Smart and Douglas H. Pearson, Ser. No. 08/590,666, now U.S. Pat. No. 5,579,070, entitled ONE-TIME-USE CAMERA HAS DRIVER FOR CLOSING FILM CASSETTE WHICH IS BROKEN TO DISABLE CAMERA AFTER COMPLETED USE and filed Jan. 24, 1996 in the names of David C. Smart and Douglas H. Pearson, Ser. No. 08/590,717, now U.S. Pat. No. 5,629,750, entitled ONE-TIME-USE CAMERA UNCOVERS INGRESS OPENING FOR INSERTION TOOL TO EJECT CASSETTE WHEN CASSETTE CLOSED and filed Jan. 24, 1996 in the names of David C. Smart and Thomas E. Dussinger, and Ser. No. 08/590,792, now U.S. Pat. No. 5,614,976, entitled CAMERA WITH MANUAL FILM REWIND LOCKED WHEN CASSETTE CLOSED, PREFERABLY TO POSITION FILM EXPOSED INDICATOR IN WINDOW OF CASSETTE and filed Jan. 24, 1996 in the names of David C. Smart and Thomas E. Dussinger.

FIELD OF THE INVENTION

The invention relates generally to the field of photography, and in particular to cameras to be used with film cassettes. More specifically, the invention relates to a one-time-use camera with a lid that is flexed to uncover a chamber when a film cassette is forcibly ejected from the chamber.

Commonly assigned prior art U.S. Pat. No. 5,357,303, issued Oct. 18, 1994, discloses a film cassette having a light lock which is pivoted closed to prevent ambient light from entering the cassette interior and is pivoted open to permit film movement out of and into the cassette interior. An implement or tool is designed to engage the light lock to pivot it open and closed.

Commonly assigned prior art U.S. Pat. No. 5,231,438, issued Jul. 27, 1993, discloses a camera intended for use with a film cassette having a light lock which is pivoted closed to prevent ambient light from entering the cassette interior and is pivoted open to permit film movement out of and into the cassette interior. The camera has a release button which when manually moved in a releasing direction actuates a latching device. The latching device normally secures a door closed over a chamber holding the film cassette. However, when the latching device is actuated, it operates to pivot the light lock closed and to release the door to uncover the chamber.

SUMMARY OF THE INVENTION

A camera comprising a chamber for holding a film cassette and a lid for closing the chamber, is characterized in that:

an ingress opening to the chamber is located to admit an insertion tool into the chamber to push the cassette against the lid to move the lid to open the chamber, to permit the cassette to be pushed out of the chamber;

the chamber and the lid have respective peripheries with mutually engaging light-trapping means which engage to secure the lid to light-tightly close the chamber, but which are separated when the lid is moved to open the chamber; and the lid is flexible and has a fixed projection which protrudes into the chamber to be pushed by the cassette to flex the lid partially out of the chamber to make the engaging means of the lid separate from the engaging means of the chamber.

BRIEF DESCRIPTION OF THE DRAWINGS

FIGS. 7, 8, 9, 10, 11, 12, 13 and 14 are opposite end views of the film cassette, depicting operation of a visual exposure indicator (VEI);

DETAILED DESCRIPTION OF THE INVENTION

The invention is disclosed as being embodied preferably in a camera. Because the features of a camera are generally known, the description which follows is directed in particular only to those elements forming part of or cooperating directly with the disclosed embodiment. It is to be understood, however, that other elements may take various forms known to a person of ordinary skill in the art.

Film Cassette

Figure 1:
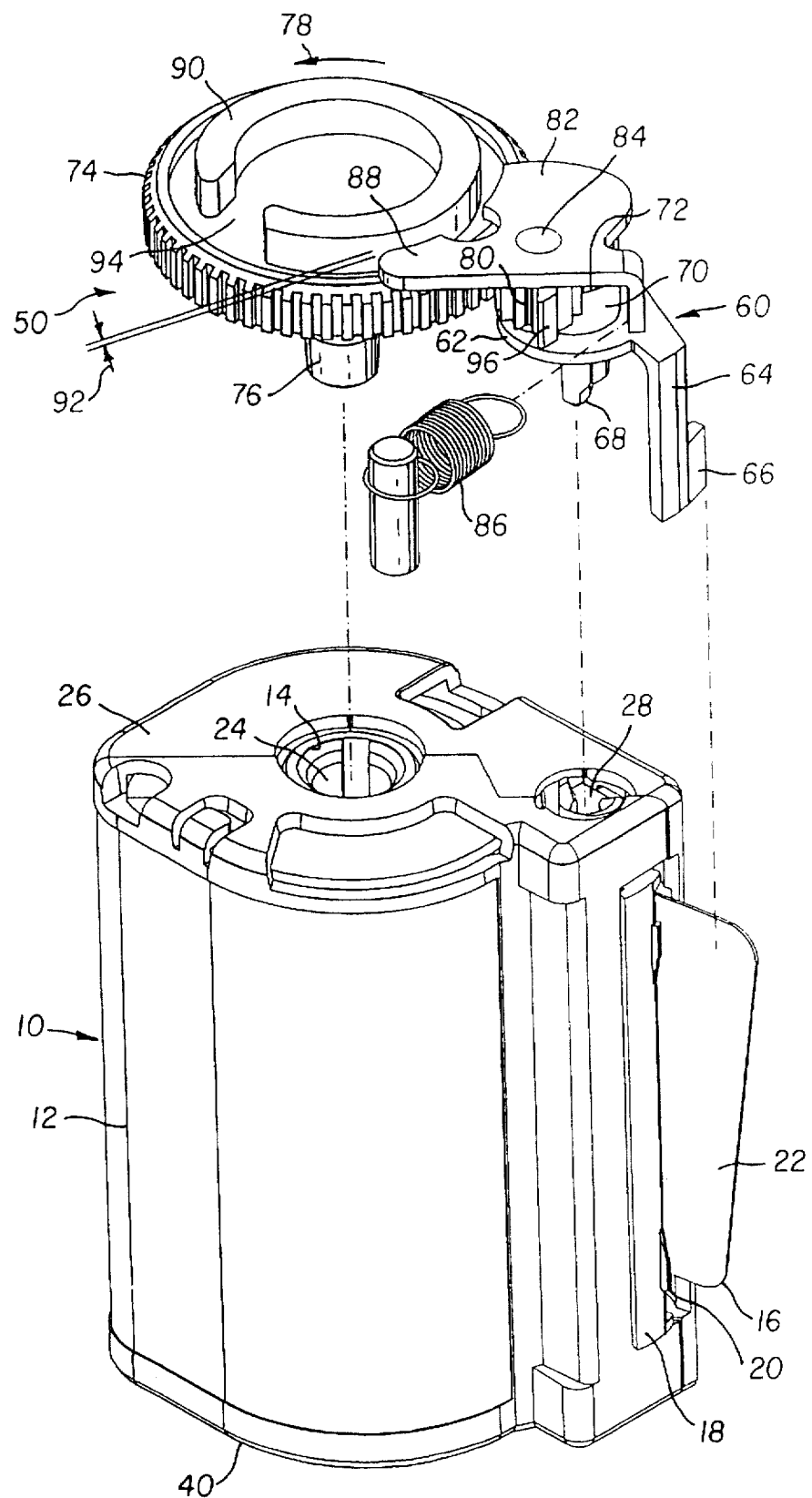
FIG. 1 is an exploded partial perspective view of a camera for use with a film cassette, according to a preferred embodiment of the invention.
Figure 2:
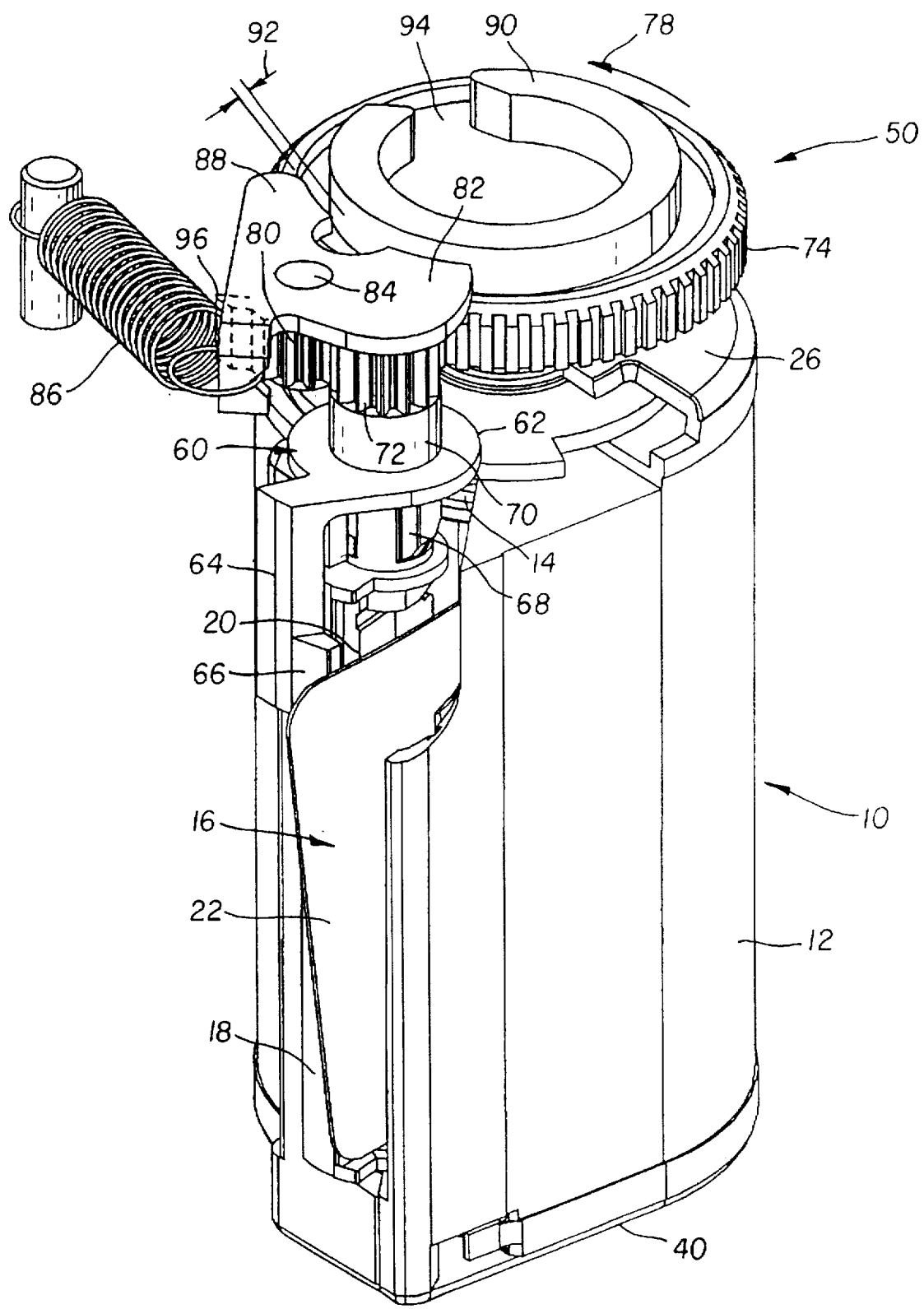
FIG. 2 is an assembled partial perspective view of the camera with the film cassette as seen from an opposite side.

Referring now to the drawings, FIGS. 1 and 2 show a film cassette 10 similar in operation to ones disclosed in prior art U.S. Pat. No. 5,357,303, issued Oct. 18, 1994, and U.S. Pat. No. 5,231,438, issued Jul. 27, 1993. The film cassette 10 includes a cassette shell 12 that contains a flanged spool 14 on which is stored a wound unexposed/exposed filmstrip 16. A slightly elastic light lock 18 is supported within a film egress/ingress slot 20 in the cassette shell 12 to be pivoted open to permit film movement out of and back into the shell, through the slot, and to be pivoted closed to prevent ambient light from entering the shell, through the slot.

Figure 6:
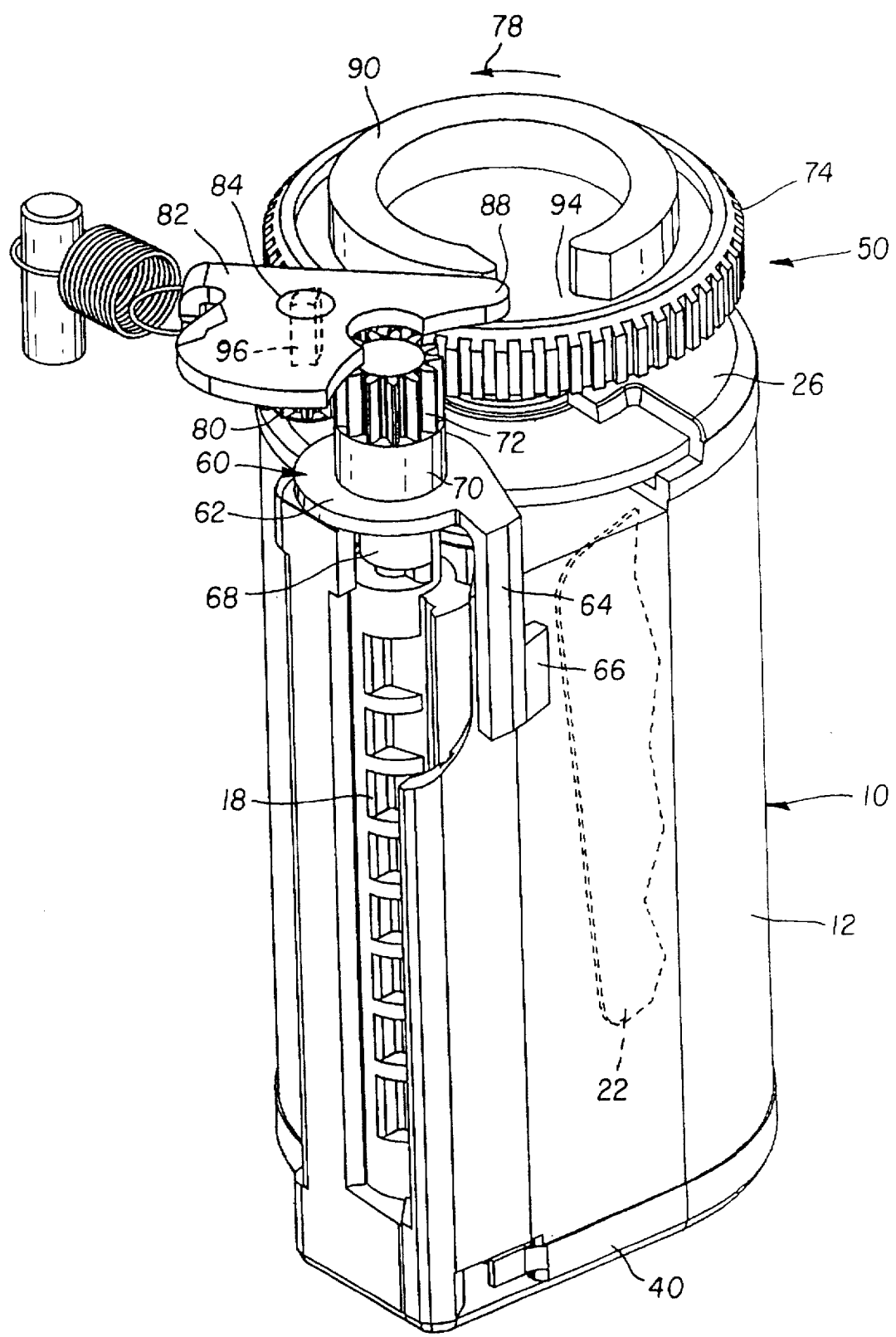

FIGS. 1 and 2 show the film cassette 10 from opposite sides, with the light lock 18 open and all but a trailing film end portion 22 of the filmstrip 16 wound into the cassette shell 12 after the filmstrip is exposed outside the cassette shell. FIG. 6 shows the light lock 18 pivoted completely closed after the trailing film end portion 22 is wound into the cassette shell 12.

The spool 14 has a coaxial drive cavity 24 accessible at a drive end 26 of the cassette shell 12 and the light lock 18 has a coaxial drive cavity 28 accessible at the same end of the cassette shell as shown in FIG. 1. A visual exposure indicator (VEI) in the form of an indicator flag 30 is rotatable coaxially with the spool 14 to be respectively positioned in four separate windows 32, 34, 36 and 38 in a VEI end 40 of the cassette shell 12 when the spool is at different predetermined angles of rotation. The VEI end 40 of the cassette shell 12 is an opposite end of the cassette shell, with respect to the drive end 26 of the cassette shell. As shown in FIGS. 7 and 8, when the spool 14 is at a predetermined acute angle of rotation 42 the indicator flag 30 is at the same angle to be positioned in the window 32, to provide a visual film-unexposed warning or indication. As shown in FIGS. 9 and 10, when the spool 14 is at a predetermined first-obtuse angle of rotation 44 the indicator flag 30 is at the same angle to be positioned in the window 34, to provide a visual film-partially-exposed warning or indication. As shown in FIGS. 11 and 12, when the spool 14 is at a predetermined second-obtuse angle of rotation 46 the indicator flag 30 is at the same angle to be positioned in the window 36, to provide a visual film-completely-exposed warning or indication. As shown in FIGS. 13 and 14, when the spool 14 is at a predetermined third-obtuse angle of rotation 48 the indicator flag 30 is at the same angle to be positioned in the window 38, to provide a visual film-processed warning or indication.

Camera

Figure 15:
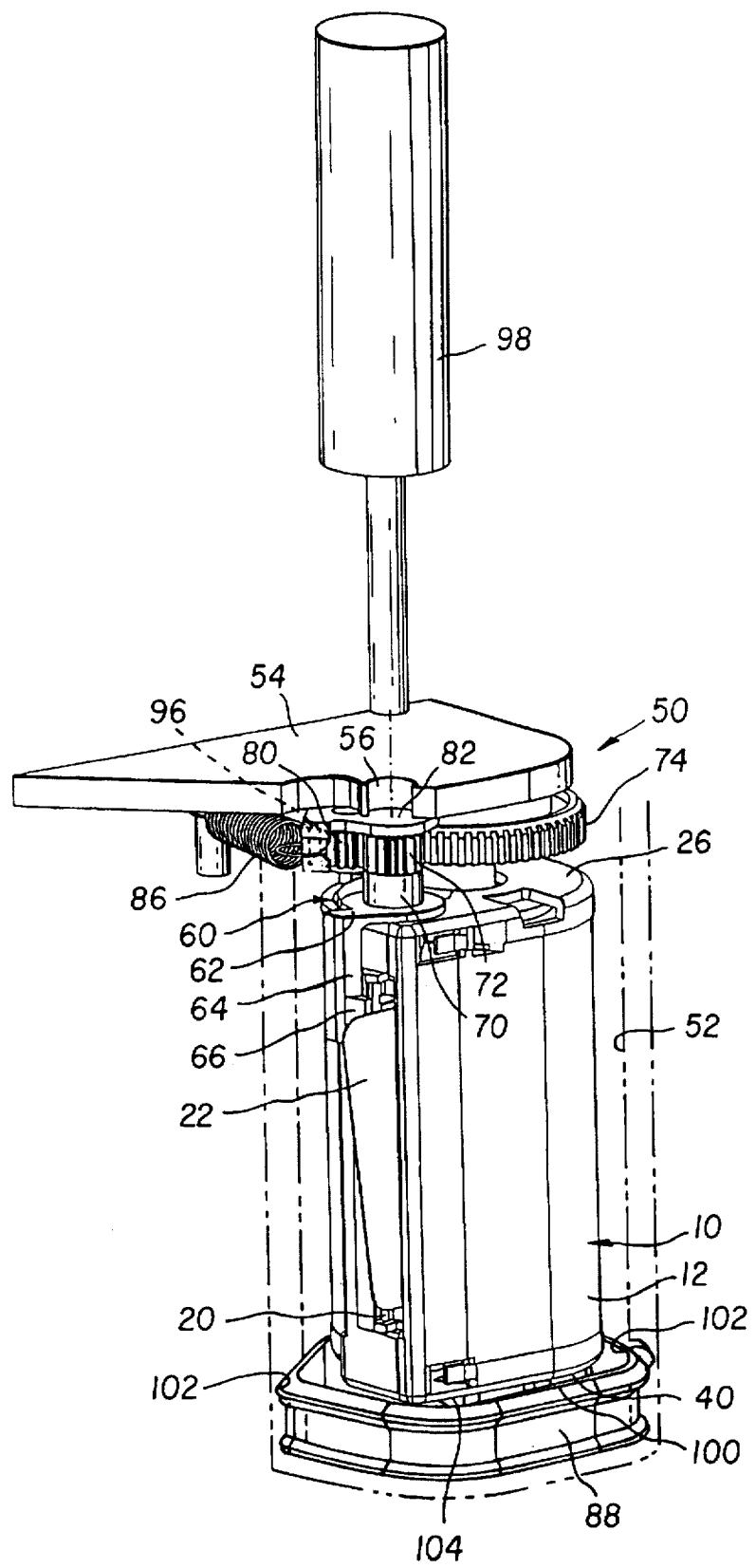
FIGS. 15, 16, 17, 18 and 19 are assembled partial perspective views of the camera with the film cassette, depicting how the film cassette is ejected from a cassette chamber.

A partially shown camera 50 with which the film cassette 10 is to be used is shown in FIGS. 1 and 15.

Looking at FIG. 15, the camera 50 includes a cassette chamber 52 for the film cassette 10. The chamber 52 is open at its top and bottom, and has a film egress/ingress slot (not shown) opposite the film egress/ingress slot 20 in the cassette shell 12 to permit film movement out of and back into the chamber. An exterior top housing portion 54 of the camera 50 has a tool ingress opening 56 which is located coaxially above the drive cavity 28 of the light lock 18. A bottom lid 58 or plug of the camera 50 removably seals the chamber 52 at its bottom.

Looking at FIGS. 1 and 2, an actuator unit 60 for pivoting the light lock 18 closed after the trailing film end portion 22 is wound into the cassette shell 12 comprises an integral single-piece driver 62 and film sensor lever 64. The film sensor lever 64 has a sensor head 66 shown in FIGS. 1 and 2 in contact with the trailing film end portion 22. The driver 62 has a depending drive-part 68 located in the drive cavity 28 of the light lock 18 to rotationally engage the light lock in order to pivot the light lock closed, and a coaxial upstanding gear-support-part 70 on which is coaxially fixed a first spur gear 72. Rotation of the first spur gear 72 in a counter-clockwise direction in FIGS. 1 and 2 similarly rotates the drive-part 68 to pivot the light lock 18 closed.

A manual film rewind thumbwheel 74 has a depending coaxial drive-part 76 located in the drive cavity 24 of the spool 14 to rotationally engage the spool. The thumbwheel 74 is manually rotated in a film winding direction 78 to similarly rotate the spool 14 to wind the filmstrip 16 including the trailing film end portion 22 into the cassette shell 12.

A second spur gear 80 continuously in mesh with the first spur gear 72 is coaxially fixed to a locking lever 82. A mount-pin 84 rotationally supports the second spur gear 80 and the locking lever 82, and maintains the second spur gear continuously spaced from the thumbwheel 74. As shown in FIGS. 1-4 and 15, the locking lever 82 is normally located beneath the tool ingress opening 56 in the top housing portion 54 to cover or block the tool ingress opening.

A tension spring 86 biases the locking lever 82 to rotate with the second spur gear 80 in a clockwise direction in FIG. 1 to, in turn, bias the first spur gear 72 to rotate in a counter-clockwise direction in FIG. 1 to urge the sensor head 66 of the film sensor lever 64 against the filmstrip 16. Film resistance at the sensor head 66 is greater than the bias of the spring 66. As a result, the spring 86 is prevented from urging the locking lever 82 to rotate with the second spur gear 80 in a clockwise direction in FIG. 1 in order to move one end 88 of the locking lever against an arcuate rib 90 on the thumbwheel 74. Instead, the lever end 88 is held spaced a slight distance 92 from the arcuate rib 90.

Operation

Figure 3:
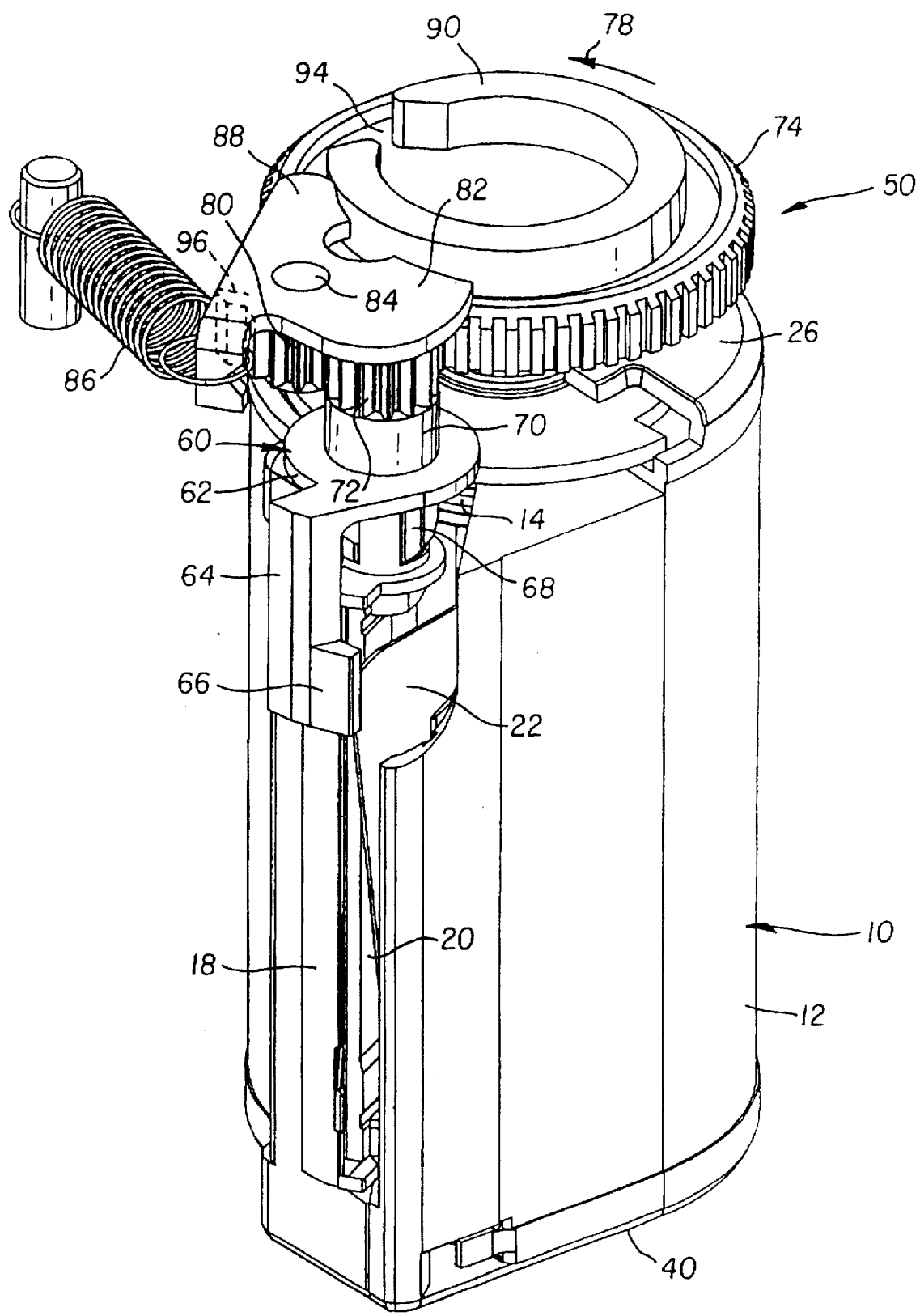
FIGS. 3, 4, 5 and 6 are assembled partial perspective views of the camera with the film cassette, depicting operation of the camera.

Going from FIGS. 1 and 2 to FIG. 3, when the thumbwheel 74 is rotated in the film winding direction 78 the trailing film end portion 22 is drawn from the sensor head 66 of the film sensor lever 64 and into the slot 20 in the cassette shell 12. Once the trailing film end portion 22 is moved clear of the sensor head 66 the resulting absence of film resistance at the sensor head allows the spring 86 to rotate the locking lever and the second spur gear 80 clockwise in FIG. 3 until the lever end 88 abuts the arcuate rib 90 on the thumbwheel 74. Consequently, the actuator unit 60 is rotated counter-clockwise in FIG. 3 via the first spur gear 72 to make the drive-part 68 similarly pivot the light lock 18 initially closed ten degrees as shown in FIG. 3, to partially (slightly) close the light lock.

Figure 4:
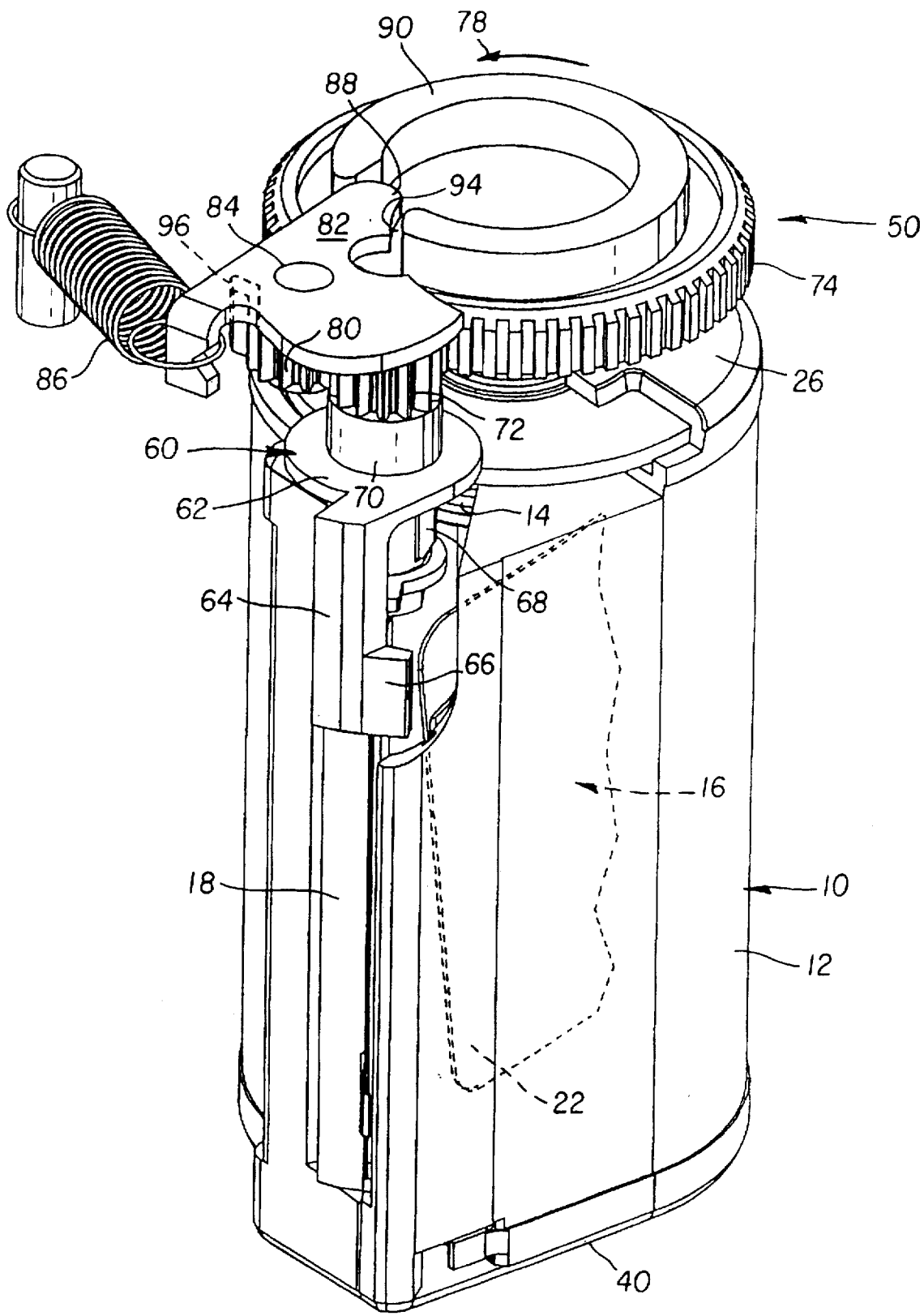

In FIG. 4, the thumbwheel 74 is rotated further in the film winding direction 78 than in FIG. 3 to draw the trailing film end portion 22 from the slot 20 and into the interior of the cassette shell 12 and to position a gap 94 in the arcuate rib 90 opposite the lever end 88. The presence of the gap 94 opposite the lever end 88 allows the spring 86 to rotate the locking lever 82 and the second spur gear 80 clockwise in FIG. 4 until the lever end is seated in the gap. Consequently, the actuator unit 60 is rotated counter-clockwise in FIG. 4 via the first spur gear 72 to make the drive-part 68 similarly pivot the light lock 18 further closed twenty degrees as shown in FIG. 4.

Figure 5:
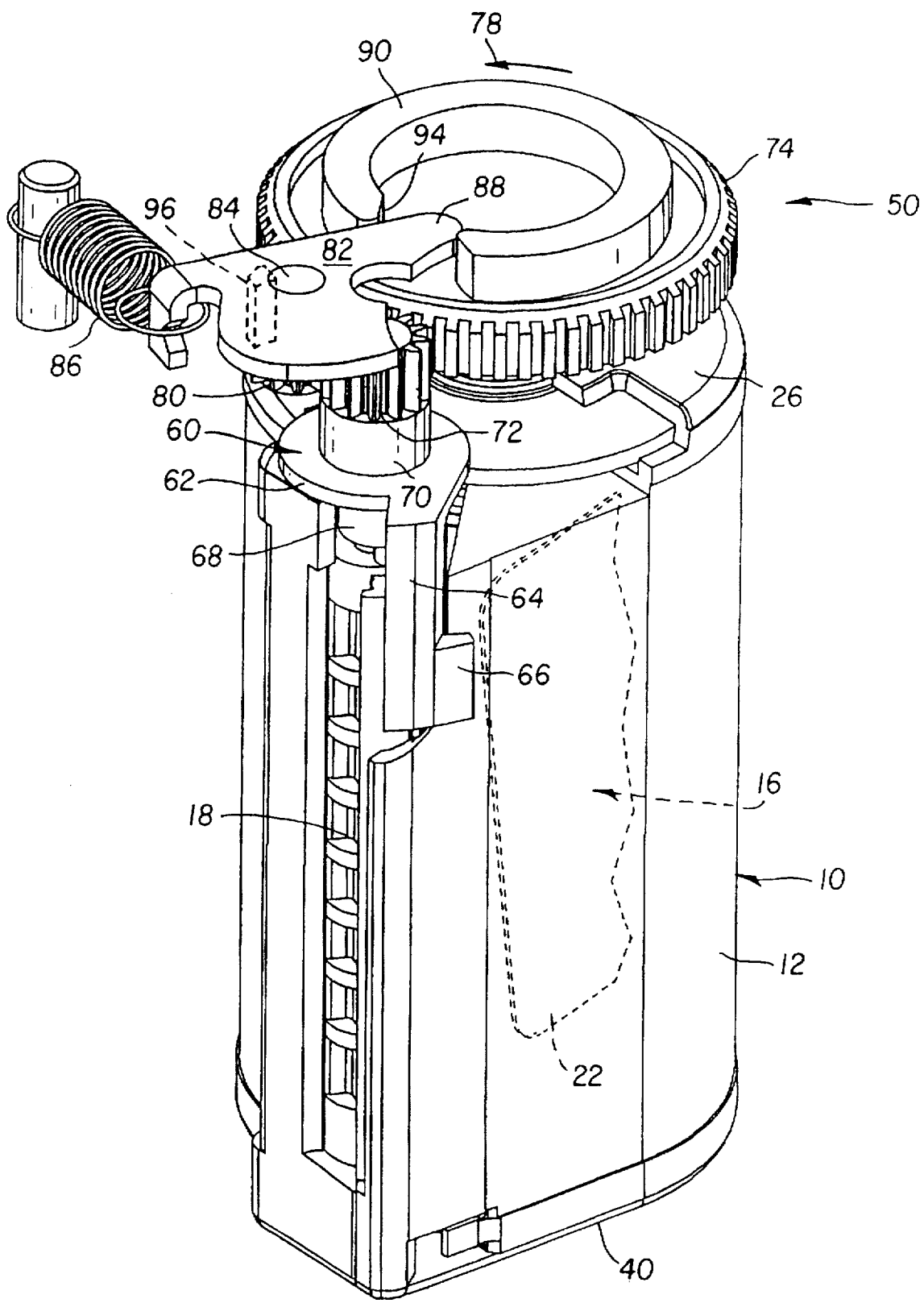

In FIG. 5, the thumbwheel 74 is rotated further in the film winding direction 78 than in FIG. 4 to draw the trailing film end portion 22 further into the interior of the cassette shell 12 and to make the arcuate rib 90 pivot the lever end 88 to rotate the locking lever 82 and the second spur gear 80 clockwise in FIG. 5. Consequently, the actuator unit 60 is rotated counter-clockwise in FIG. 5 via the first spur gear 72 to make the drive-part 68 similarly pivot the light lock 18 further closed thirty degrees as shown in FIG. 5.

In FIG. 6, the thumbwheel 74 is rotated further in the film winding direction 78 than in FIG. 5 to draw the trailing film end portion 22 further into the interior of the cassette shell 12 and to make the arcuate rib 90 pivot the lever end 88 to rotate the locking lever 82 and the second spur gear 80 clockwise in FIG. 5 until the lever end is pivoted out of the gap 94. Consequently, the actuator unit 60 is rotated counter-clockwise in FIG. 6 via the first spur gear 72 to make the drive-part 68 similarly pivot the light lock 18 further closed thirty-two degrees as shown in FIG. 6, to completely close the light lock.

Figure 16:
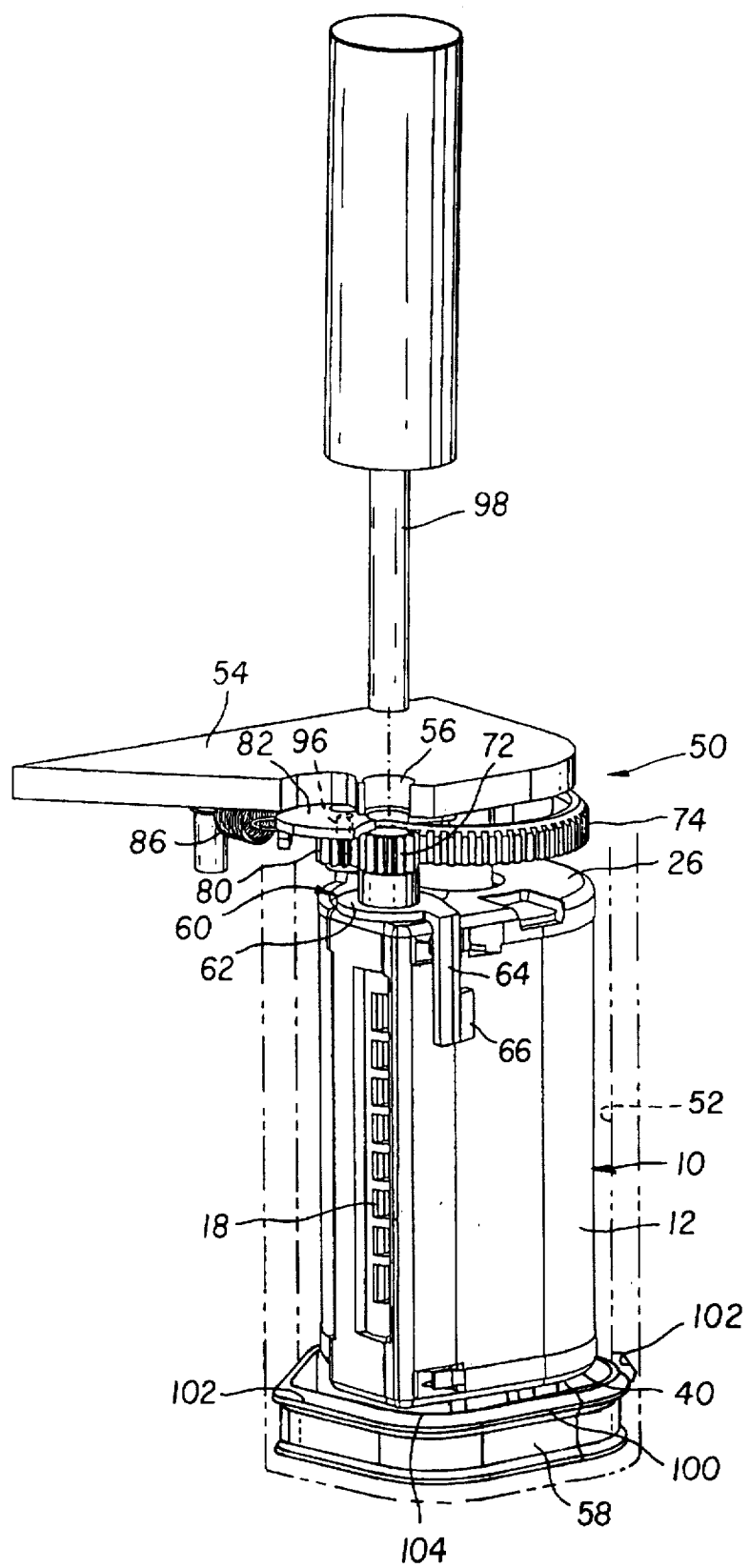

At this time, a locking tooth 96 on the underside of the locking lever 82 is moved into engagement with the thumbwheel 74 to prevent further rotation of the thumbwheel in the film winding direction 78 as shown in FIGS. 6 and 16.

The locking tooth 96 secures the thumbwheel 74 with the spool 14 at the predetermined second-obtuse angle of rotation. As shown in FIGS. 11 and 12, when the spool 14 is at the predetermined second-obtuse angle of rotation 46 the indicator flag 30 is at the same angle and, therefore is positioned in the window 36 to provide a visual film-completely-exposed warning or indication.

Also, the locking lever 82 uncovers the tool ingress opening 56 in the top housing portion 54. Then, as shown in FIGS. 16, 17, 18 and 19 a manual insertion tool 98 can be inserted through the ingress opening 56 and against the first spur gear 72 to force the actuator unit 60 and, therefore, the film cassette 10 downward in the chamber 52.

Figure 17:
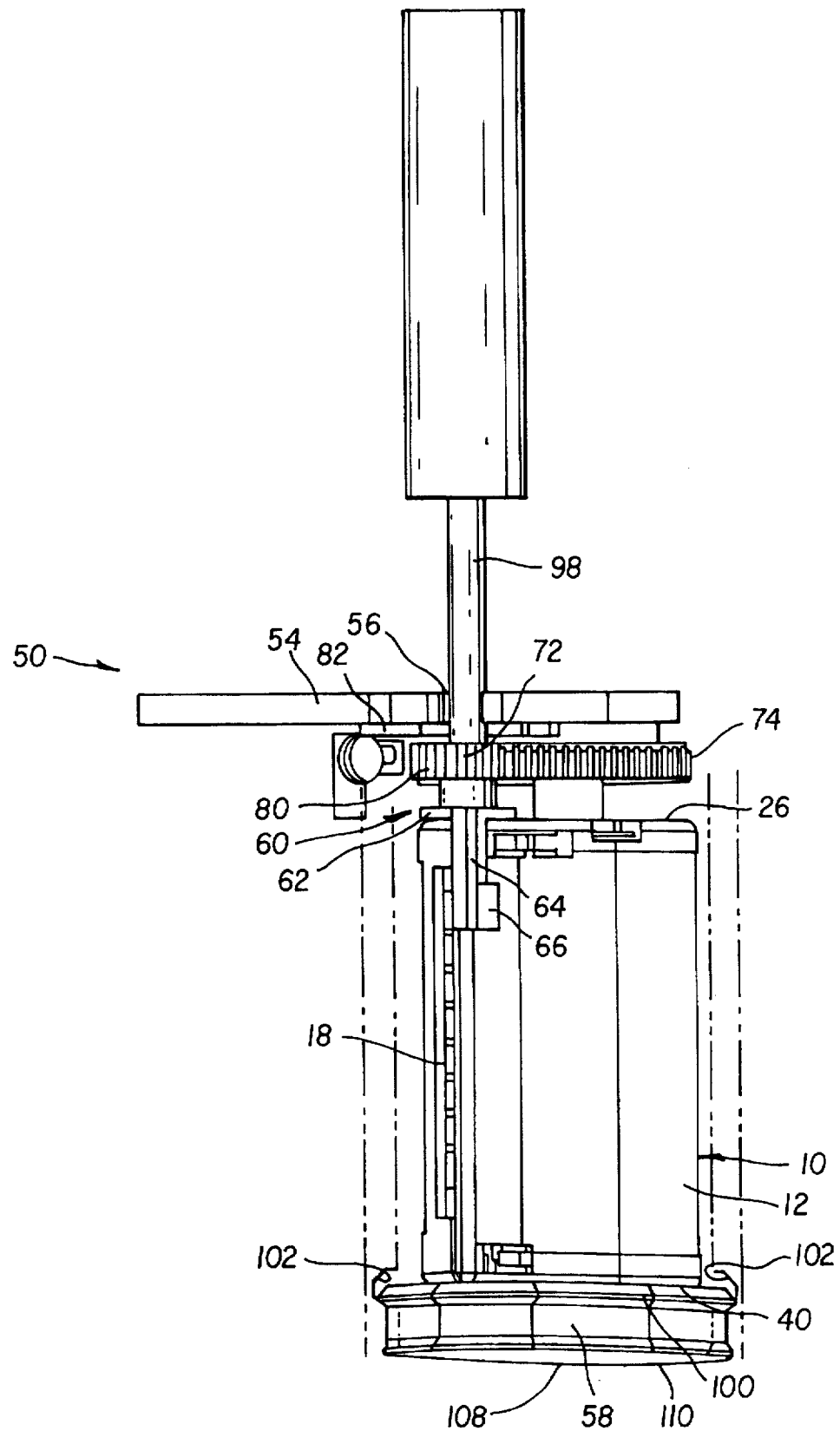
Figure 18:
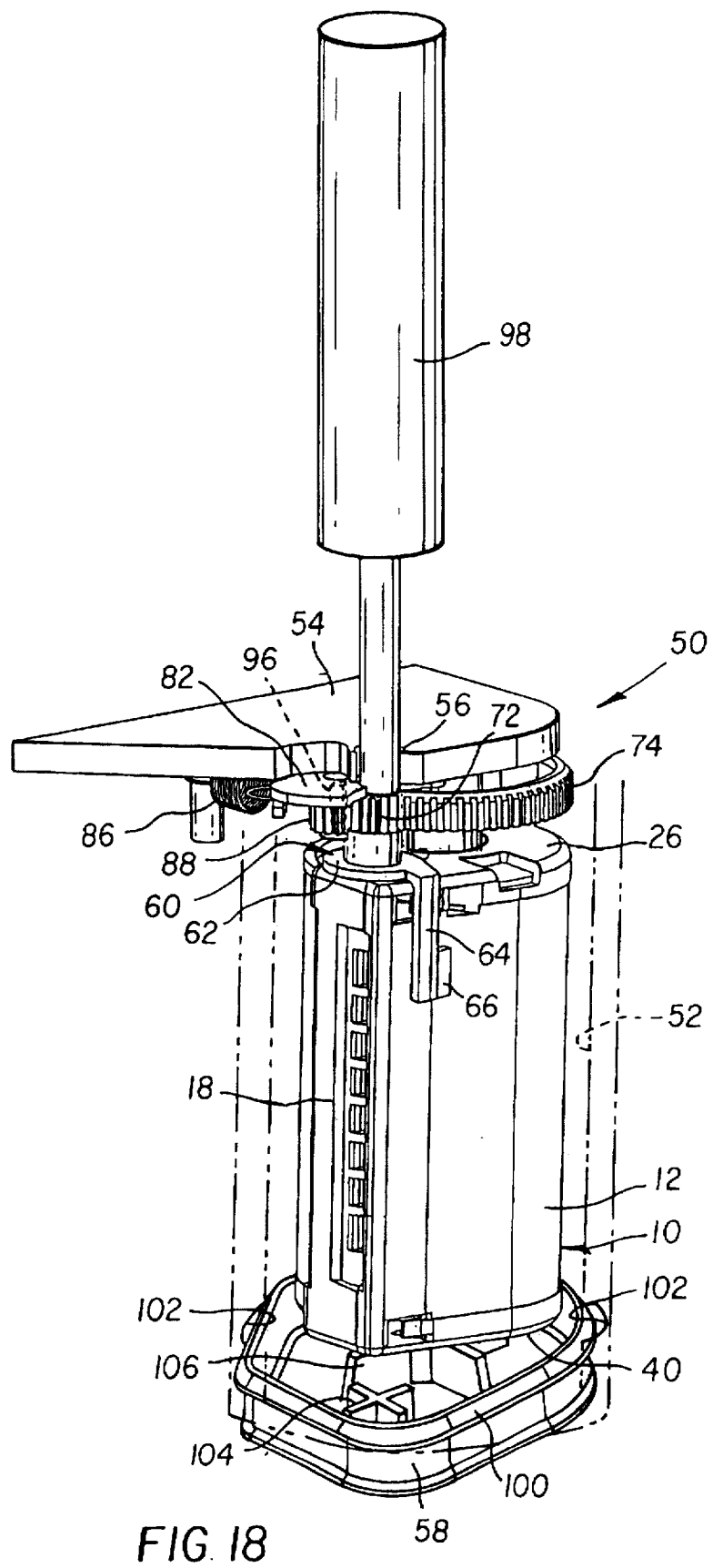
Figure 19:
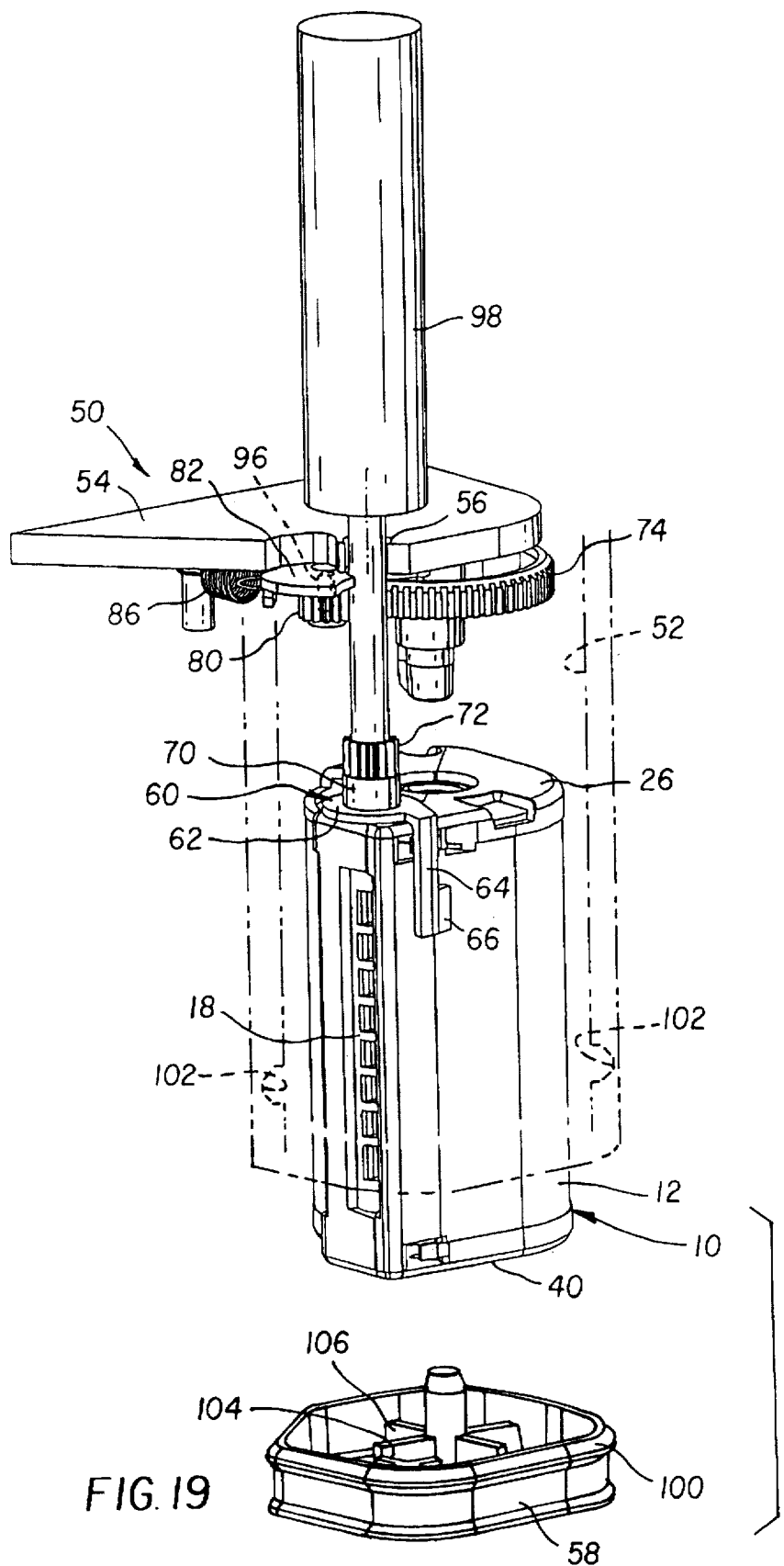

As shown in FIGS. 15 and 16, the bottom lid 58 has a peripheral annular bead or lip 100 which is snugly received within a mating peripheral annular groove 102 in the chamber 52 to removably secure the lid in place to light-tightly close the chamber at its bottom. The lid 58 is flexible, and has a fixed x-shaped projection 104 inwardly adjacent the peripheral annular lip 100 and a fixed x-shaped projection 106 which is centered on the lid to be radially spaced from the lip. See FIG. 19. The projection 104 protrudes into the chamber 52 in line with the drive-part 68 of the actuator unit 60. The projection 106 protrudes into the chamber 52 in line with the drive-part 76 of the thumbwheel 74. The two projections 104 and 106 are the same height. When the manual insertion tool 98 is inserted through the ingress opening 56 and against the first spur gear 72 to force the actuator unit 60 and the film cassette 10 downward in the chamber 52, the cassette is pushed simultaneously against the two projections 104 and 106. Consequently, the lid 58 is flexed or bowed slightly out of the chamber 52 at a central portion 108 of the lid, beneath the projection 106, and is flexed or bowed slightly out of the chamber at an adjoining radial portion 110 of the lid, close to the projection 104, as shown in FIG. 17. This distortion of the lid 58 causes the peripheral annualar lip 100 of the lid to start to separate from the peripheral annular groove 102 in the chamber 52, beginning in the vicinity of the projection 104 as shown in FIG. 18. Then, continued pushing of the cassette 1 against the projection 106 continues to progressively separate the peripheral annular lip 100 of the lid 58 from the peripheral annular groove 102 in the chamber 52. When the separation is completed, the lid 58 falls away from the chamber 52 and the cassette 10 is pushed out of the chamber. See FIG. 19.

The invention has been described with reference to a preferred embodiment. However, it will be appreciated that variations and modifications can be effected by a person of ordinary skill in the art without departing from the scope of the invention. For example, instead of the two projections 104 and 106 being the same height, the projection 104 can be slightly taller than the projection 106.

PARTS LIST
10. film cassette
12. cassette shell
14. flanged spool
16. filmstrip
18. light lock
20. slot
22. trailing film end portion
24. drive cavity
26. drive end
28. drive cavity
30. indicator flag
32. window
34. window
36. window
38. window
40. VEI end
42. acute angle of rotation
44. first-obtuse angle of rotation
46. second-obtuse angle of rotation
48. third-obtuse angle of rotation
50. camera
52. cassette chamber
54. top housing portion
56. tool ingress opening
58. bottom lid
60. actuator unit
62. driver
64. film sensor lever
66. sensor head
68. drive-part
70. gear-support-part
72. first spur gear
74. film rewind thumbwheel
76. drive-part
78. film winding direction
80. second spur gear
82. locking lever
84. mount-pin
86. tension spring
88. lever end
90. arcuate rib
92. slight distance
94. gap
96. locking tooth
98. insertion tool
100. peripheral annular lip
102. peripheral annular groove
104. x-shaped projection
106. x-shaped projection
108. central portion
110. adjoining portion

We claim:

1. A camera comprising a chamber for holding a film cassette and a lid for closing said chamber which is movable relative to said chamber to open the chamber, is characterized in that:

an ingress opening to said chamber is located to admit an insertion tool into said chamber to push the cassette in the chamber against said lid to move the lid to open the chamber, to permit the cassette to be pushed out of the chamber;

said chamber and said lid have respective peripheries with mutually engaging light-trapping portions which engage to secure the lid to light-tightly close the chamber, but which are separated when the lid is moved relative to the chamber to open the chamber; and said lid is flexible and has a fixed rigid non-resilient projection which protrudes into said chamber and is located to be pushed by the cassette in the chamber to flex the lid partially out of the chamber to move the lid relative to the chamber and make said engaging portion of the lid separate from said engaging portion of the chamber.

2. A camera as recited in claim 1, wherein said fixed projection is located only adjacent the periphery of said lid to make said engaging portion of the lid start to separate from said engaging portion of said chamber in the vicinity of the fixed projection when the fixed projection is pushed by the cassette in the chamber.

3. A camera as recited in claim 1, wherein said fixed projection is centered on said lid to flex a central portion of the lid partially out of said chamber when the fixed projection is pushed by the cassette.

4. A camera as recited in claim 1, wherein said fixed projection is located proximate the periphery of said lid to make said engaging means of the lid start to separate from said engaging means of said chamber in the vicinity of the fixed projection when the fixed projection is pushed by the cassette in said chamber, and another projection is located on said lid and protrudes into said chamber at a different position than said fixed projection to be pushed by the cassette in said chamber to flex a non-peripheral portion of the lid partially out of said chamber to continue to separate said engaging means of the lid from said engaging means of said chamber.

5. A camera comprising a chamber for holding a film cassette and a lid for closing said chamber, is characterized in that:

an ingress opening to said chamber is located to admit an insertion tool into said chamber to push the cassette in the chamber against said lid to move the lid to open the chamber, to permit the cassette to be pushed out of the chamber;

said chamber and said lid have respective peripheries with mutually engaging light-trapping means which engage to secure the lid to light-tightly close the chamber, but which are separated when the lid is moved to open the chamber; and said lid is flexible and has first and second projections which protrude into said chamber to be pushed by the cassette in the chamber to flex the lid partially out of the chamber to make said engaging means of the lid separate from said engaging means of the chamber, said first projection being located proximate the periphery of said lid to make said engaging means of the lid start to separate from said engaging means of said chamber in the vicinity of the first projection when the first projection is pushed by the cassette, and said second projection is centered on said lid and protrudes into said chamber to be pushed by the cassette to flex a central portion of the lid partially out of said chamber to continue to separate said engaging means of the lid from said engaging means of said chamber.

6. A camera as recited in claim 5, wherein said first and second projections are the same height.

7. A camera as recited in claim 5, wherein said first projection is taller than said second projection.

8. A camera comprising a chamber for holding a film cassette and a lid for closing said chamber which is movable relative to said chamber to open the chamber, is characterized in that:

an ingress opening to said chamber is located to admit an insertion tool into said chamber to push the cassette in the chamber against said lid to move the lid to open the chamber, to permit the cassette to be pushed out of the chamber;

said chamber and said lid have respective peripheries with mutually engaging light-trapping portions which engage to secure the lid to light-tightly close the chamber, but which are separated when the lid is moved relative to the chamber to open the chamber; and said lid is flexible to be bowed, thereby to bend the lid into a curve from the chamber, and has a fixed projection which protrudes into said chamber and is located to be pushed by the cassette in the chamber to bow the lid, thereby to bend the lid into a curve, partially out of the chamber to make said engaging portion of the lid separate from said engaging portion of the chamber.

9. A camera comprising a chamber for holding a film cassette with a rotatable film spool and a lid for closing said chamber, is characterized in that:

an ingress opening to said chamber is located to admit an insertion tool into said chamber to push the cassette in the chamber against said lid to move the lid to open the chamber, to permit the cassette to be pushed out of the chamber;

said chamber and said lid have respective peripheries with mutually engaging light-trapping means which engage to secure the lid to light-tightly close the chamber, but which are separated when the lid is moved to open the chamber; and said lid is flexible and has a fixed projection which protrudes into said chamber and is located to be in coaxial alignment with one end of the film spool of the cassette in the chamber, to be pushed by the cassette at that end of the film spool to flex the lid partially out of the chamber to make said engaging means of the lid separate from said engaging means of the chamber.

* * * * *